No. 660,152. Patented Oct. 23, 1900.
J. R. DUNCAN.
ELECTRIC WELDING TONGS.
(Application filed May 17, 1900.)
(No Model.)
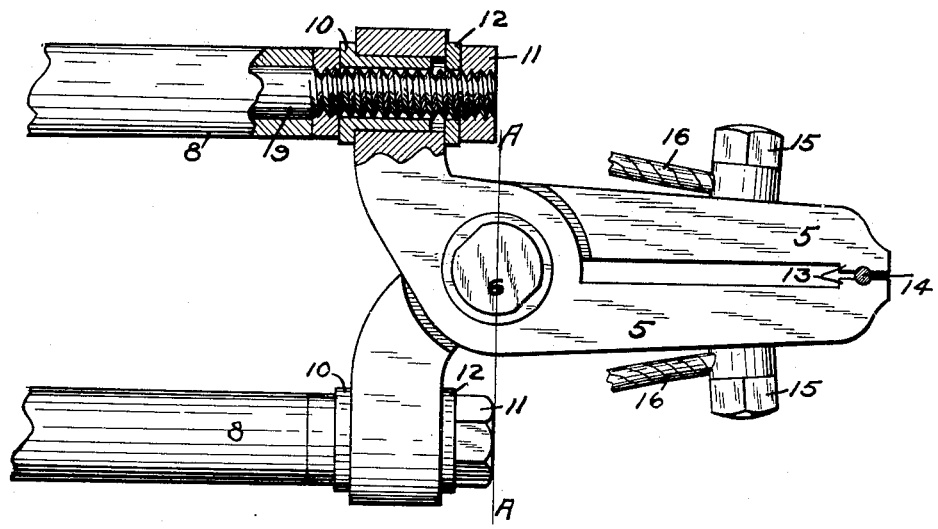
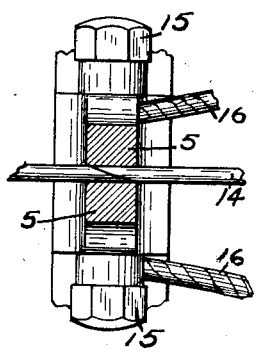
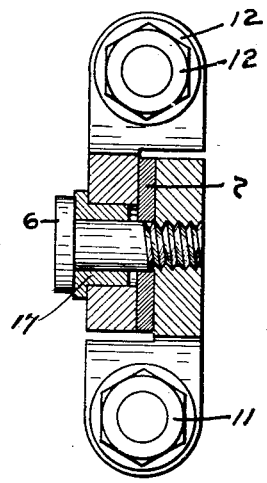
WITNESSES:
M. C. Buck
G. H. Blaker
INVENTOR.
John R. Duncan,
BY V. H. Lockwood
His ATTORNEY.

UNITED STATES PATENT OFFICE.

JOHN R. DUNCAN, OF INDIANAPOLIS, INDIANA, ASSIGNOR OF FIVE-EIGHTHS TO CALVIN F. DARNELL AND C. AUGUSTUS SCHMIDT, OF SAME PLACE.

ELECTRIC WELDING-TONGS.

SPECIFICATION forming part of Letters Patent No. 660,152, dated October 23, 1900.

Application filed May 17, 1900. Serial No. 16,981. (No model.)

*To all whom it may concern:*

Be it known that I, JOHN R. DUNCAN, of Indianapolis, county of Marion, and State of Indiana, have invented a certain new and useful Electric Welder; and I do hereby declare that the following is a full, clear, and exact description thereof, reference being had to the accompanying drawings, in which like letters refer to like parts.

The object of this invention is to make a simple electric welder for welding wires, metal bands, and the like.

The invention broadly consists in a pair of tongs to each jaw of which an electrical conductor is attached, so that the current passes from one jaw to the other transversely through the objects to be welded. In such case the objects to be welded should be placed between the jaws, overlapping each other.

The full nature of this invention will be understood from the accompanying drawings and the description following of one form of device embodying my said invention, and the scope of the invention will be understood from the claims following said description.

In the drawings, Figure 1 is a side elevation of my electric welder with parts being in section and parts being broken away. Fig. 2 is an end elevation of the jaws, the rear parts being broken away and the front part being in vertical section where the wires to be welded are grasped. Fig. 3 is a section on the line A A of Fig. 1.

Referring now to the details of the construction of the device herein shown for the purpose of illustrating the general nature of my invention, I take two jaws 5, pivoted together like tongs by the bolt 6 and separated by the insulating-washer 7. An insulating-ring 17 surrounds one end of the bolt 6 and insulates said bolt from one of the jaws 5 in order to completely insulate the jaws from each other. To the shanks of the tongs handles 8 are secured. Those here shown are wooden handles mounted on iron rods 9, that pass through the insulating-sleeves 10 and are held in place by the nuts 11, protected by the insulating-washers 12. Any construction of tongs will answer, so long as the handles are insulated from the jaws and the jaws are insulated from each other. The ends of the jaws are provided with jaw-faces 13, that, as herein shown, are provided with transverse grooves registering with each other to receive the wires 14 to be welded. These grooves should be shallow, so that when the wires 14 are in place the jaws will be sufficiently apart to prevent the passage of the electric current any other way than through the wire to be welded. Each jaw is provided with a binding-post 15, to which the electric wire 16 is secured. Electricity is supplied from any suitable source through the wires in order to pass a current from one jaw through the thing to be welded to the other jaw.

The wires or articles to be welded should have their ends beveled, as shown in Fig. 2, so that they when placed together will overlap. The grasp of the jaws on the wires at the time of passing the current through them should not be strong, only sufficient to hold the wires in place. The current passes transversely through the wires to be welded and heats them from the exterior to the interior and is sufficiently heated in a few seconds. The jaws should then be clamped rather tightly in order to press the two heated ends of the wires 14 together to effect the proper union. By reason of the wires fitting in the grooves referred to in the jaws after the welding the union will be comparatively smooth and round and free from any injurious annular projection.

There are several advantages arising from the use of this welder. It is easily handled with one hand, the one hand grasping both handles 8 and easily separating the jaws or bringing them together. No electric switch is necessary, for when the jaws are brought together on the wire to be welded the current passes and when they are separated the current cannot pass. In addition to the easy manipulation and economy of construction the work can be done very rapidly when welding small things like wire, metal bands, and the like. When welding bands, the jaws need not be provided with a groove, but the jaw-faces 13 may be smooth. The wires can be welded without the grooves also, if desired.

Brazing can be done with this device as well as welding, and I do not wish to limit it to welding.

What I claim as my invention, and desire to secure by Letters Patent, is—

1. An electric welder comprising a pair of jaws and a pair of handles connected to the same, a washer insulating said jaws at their joint, and a sleeve insulating said handles at said points of connection, substantially as set forth.

2. An electric welder comprising a pair of tongs having a pair of jaws and a pair of handles connected to the same, a washer insulating said jaws at their joint, a sleeve insulating said handles at said points of connection, and an electrical connection with said jaws whereby the current will pass from one to the other transversely through the articles to be welded.

In witness whereof I have hereunto affixed my signature in the presence of the witnesses herein named.

JOHN R. DUNCAN.

Witnesses:
M. C. BUCK,
V. H. LOCKWOOD.